(No Model.)
H. M. POPE.
DUST GUARD FOR PEDAL BEARINGS.
No. 520,537. Patented May 29, 1894.
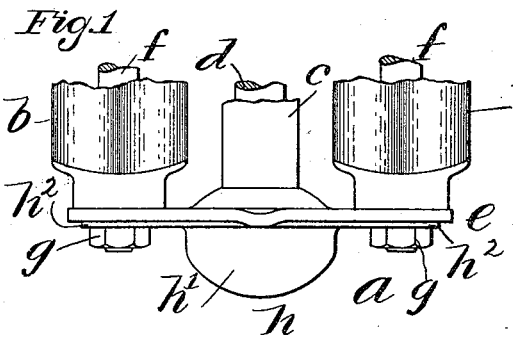
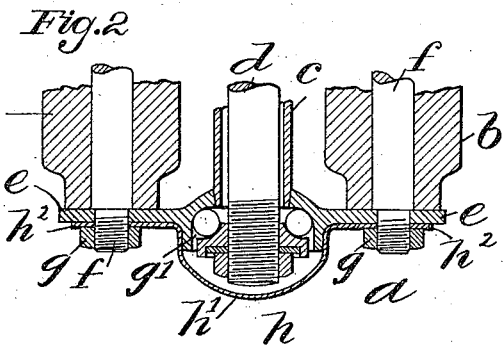
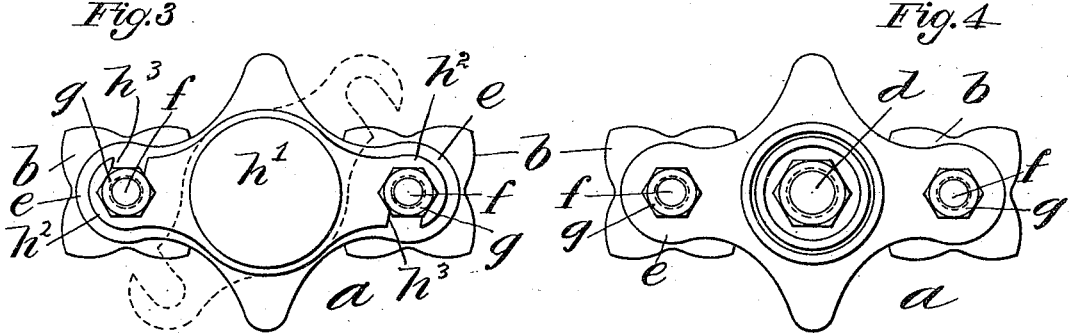
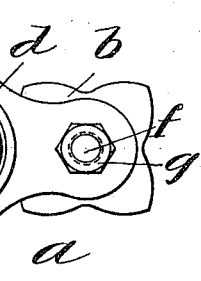
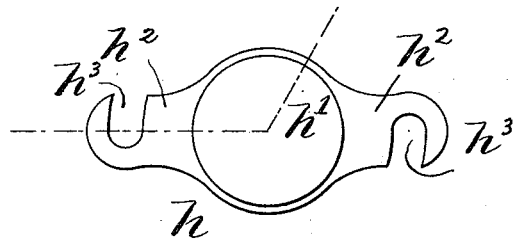
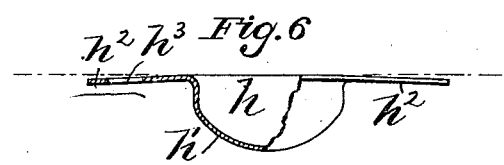
Witnesses:
Jos. Arth. Cantin
Arthur B. Jenkins
Inventor:
Harry M. Pope.
By his Attorney,
Chas. L. Burdett.

UNITED STATES PATENT OFFICE.

HARRY M. POPE, OF HARTFORD, CONNECTICUT, ASSIGNOR TO THE POPE MANUFACTURING COMPANY, OF BOSTON, MASSACHUSETTS.

DUST-GUARD FOR PEDAL-BEARINGS.

SPECIFICATION forming part of Letters Patent No. 520,537, dated May 29, 1894.

Application filed January 9, 1894. Serial No. 496,330. (No model.)

*To all whom it may concern:*

Be it known that I, HARRY M. POPE, of Hartford, in the county of Hartford and State of Connecticut, have invented certain new and useful Improvements in Dust-Guards for Pedal-Bearings, of which the following is a full, clear, and exact description, whereby any one skilled in the art can make and use the same.

The object of my invention is to provide a dust cap and guard which shall protect from exposure the bearing at the outer end of the pin which supports the pedal on the crank in velocipedes and like forms of vehicles; and to this end my invention comprises the removable dust guard and the combination of such guard with the fastening device on the pedal end, as shown in the accompanying drawings, forming a part hereof, the invention being more particularly hereinafter described and set forth in the claims.

Referring to the drawings: Figure 1 is a detail top view of part of the pedal showing the pedal end and the dust guard in edge view. Fig. 2 is a horizontal section on a plane passing centrally through the pedal barrel and other parts of Fig. 1. Fig. 3 is a detail end view of a pedal showing my improved dust guard in place in full lines, and in its first position in dotted outlines. Fig. 4 is a detail end view of a pedal showing the pedal pin bearing unprotected. Fig. 5 is a detail face view of a dust guard. Fig. 6 is a detail edge view of the dust guard with part cut away in central section.

My improved dust cap is made of a single piece of thin metal adapted to be secured to a pedal end without requiring the use of any fastening means other than those required with other parts of the pedal.

In the accompanying drawings, the letter $a$ denotes a pedal, $b$ the pedal rubbers, $c$ the hollow pedal shaft, $d$ the pedal pin and $e$ the pedal end. The several parts of the pedal are usually connected by means of bolts $f$ which extend through the pedal rubbers and through the pedal ends, nuts $g$ being screwed onto the threaded ends of the bolts to hold the parts together. A ball bearing socket $g'$ is formed in the pedal end and requires a cover of some kind to prevent dust and dirt from entering.

My improved dust cap $h$ is made by stamping or striking it up from a thin piece of metal and forming it with a recessed central portion or bearing cover $h'$, concaved on the lower surface and with lateral arms $h^2$ long enough to extend to and slightly over or beyond the ends of the bolts $f$ when the dust cap is in place. In the edges of the arms $h^2$ lateral slots $h^3$ are made for the purpose of engaging the ends of the bolts $f$, the nuts $g$ being turned off far enough to allow the thin arm to be slipped into position between the pedal end and the under surface of the nut before the parts are finally secured in position. These lateral slots are made preferably in that edge of the arm toward which the outer edge of the nut turns in tightening it in place on the bolt, or on the opposite edges, being made in reverse (as shown in Figs. 3 and 5) with the open end pointing in opposite directions. The arms are preferably turned outward, as illustrated in Fig. 6 of the drawings, so that the spring action of the metal may be utilized in holding the bearing cover tightly in place on the pedal end. When the parts are so made, the rotary movement of the nut in tightening it will tend to draw the cover into place and aid in firmly securing it.

The dust cap is attached to a pedal end by turning off the nuts a distance just sufficient to enable the thin arms of the cover to be slipped underneath the nuts as before stated, and the cap is then placed with the bearing cover immediately over the bearing (in a position indicated by the dotted outlines in Fig. 3) and then while held in such place the dust cap is turned and the edges of the arms thrust under the nuts, the sockets in the edges of the arms enabling the latter to engage the bolts. The nuts are then screwed down tightly and the dust cap firmly held in place, the outturned position of the arm of the dust cap whereby the spring action of the cap as a whole is obtained when the nut is screwed down and a tight joint formed between the dust cap and the end piece, forming an important feature present in the structure which is not dependent on the form or precise location of the slot in the arm.

I claim as my invention—

1. As an improved article of manufacture, a dust cap for a pedal bearing made of sheet metal and comprising a recessed central portion adapted to cover the spindle end, and arms extending on opposite sides of the center, each arm having a lateral slot on the edge toward which the outer edge of the nut turns in tightening to attach said dust cap to the pedal end, the said recessed central portion of the cover and the slots registering with the spindle end and the ends of the pedal rubber bolts respectively, all substantially as described.

2. In combination in a pedal for velocipedes, the pedal pin bearings in the end piece, the bolt ends extending therethrough, nuts screwed on the bolt ends, and a dust cap with a recessed bearing cover and with arms having each on opposite edges a lateral slot adapted to engage the bolt ends and underlie the nuts, the arms being normally turned away from the end piece, substantially as set forth.

3. In combination in a pedal for velocipedes, a pedal pin and end piece, the pedal bearings in the end piece and on the spindle end respectively, the anti-friction balls located in the ball-race between such bearings, the pedal rubber bolts extending through the pedal end, nuts screwed on the bolt ends, and a dust cap with a recessed bearing cover adapted to overlie and cover the end of the pedal spindle and its bearing, arms projecting beyond the pedal rubber bolts and having sockets adapted to engage the bolt ends, the said arms being normally turned outward from the end piece, all substantially as described.

HARRY M. POPE.

Witnesses;
J. L. BUNCE,
FELLON PARKER.